United States Patent
Chedeau et al.

(10) Patent No.: US 10,121,270 B2
(45) Date of Patent: Nov. 6, 2018

(54) FLEXIBLE IMAGE LAYOUT

(71) Applicant: Facebook, Inc., Menlo Park, CA (US)

(72) Inventors: Christopher Serge Benjamin Chedeau, Redwood City, CA (US); Brian K. Dewey, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/932,932

(22) Filed: Jul. 1, 2013

(65) Prior Publication Data

US 2015/0002527 A1    Jan. 1, 2015

(51) Int. Cl.
*G09G 5/00* (2006.01)
*G06T 11/60* (2006.01)

(52) U.S. Cl.
CPC .................................. *G06T 11/60* (2013.01)

(58) Field of Classification Search
CPC ..... G06T 11/001; G06T 15/04; G06T 15/005; G06T 2200/24; G06T 3/40; G06T 11/00; G06T 11/60; G06F 9/4443; G06F 3/048; G06F 9/44; G06F 21/20; G06F 17/30; G09G 2340/045; G09G 5/36; G09G 5/373; G09G 5/00; G06K 15/00; G06K 15/02
USPC .................................. 345/581, 619, 629–641
See application file for complete search history.

(56) References Cited

U.S. PATENT DOCUMENTS 7,990,564 B2    8/2011  Hanechak
8,867,849 B1*  10/2014  Kirkham et al. ............. 382/224
9,219,830 B1* 12/2015  Ciorba ............... H04N 1/00177
2005/0044485 A1*  2/2005  Mondry ............... G06Q 10/043
                                                        715/247
2007/0024909 A1*  2/2007  Hanechak ..................... 358/1.18
2007/0201740 A1*  8/2007  Kuwata .................. G06T 11/60
                                                        382/162

(Continued)

FOREIGN PATENT DOCUMENTS

JP            09270020 A    10/1997
JP         2000048216 A     2/2000

(Continued)

OTHER PUBLICATIONS

International Search Report and Written Opinion for International Application PCT/US2014/044276, dated Oct. 2, 2014.

(Continued)

*Primary Examiner* — Ryan R Yang
(74) *Attorney, Agent, or Firm* — Baker Botts L.L.P.

(57) ABSTRACT

Particular embodiments of a computing device determine unoccupied positions in a display grid, wherein the grid corresponds to specifications for a displayable region of a screen associated with a computing device. A plurality of image elements are identified as candidates for placement within the grid. Then, while at least one unoccupied position and at least one candidate image element remain, one of the candidate image elements is matched to a set of the unoccupied positions, and the positions in the matched set are designated as occupied by the matched image element. Matching may be based on a pattern of positions, which is determined using the size and the shape of the image element and a size of a position in the grid. Layout information is then provided to render the image elements in accordance with placement of each matched image element at the designated positions in the grid.

18 Claims, 9 Drawing Sheets

(56) References Cited

U.S. PATENT DOCUMENTS

| | | | |
|---|---|---|---|
| 2010/0020101 A1 | 1/2010 | Schormann | |
| 2010/0281065 A1* | 11/2010 | Balinsky | 707/798 |
| 2011/0060979 A1* | 3/2011 | O'Brien-Strain | G09G 5/14 |
| | | | 715/204 |
| 2011/0072376 A1* | 3/2011 | Moore et al. | 715/765 |
| 2011/0093454 A1 | 4/2011 | Mukai | |
| 2012/0317543 A1* | 12/2012 | Baudel | G06F 8/34 |
| | | | 717/105 |
| 2013/0050217 A1* | 2/2013 | Armitage | 345/440 |
| 2013/0083053 A1* | 4/2013 | Milne | G06F 9/4443 |
| | | | 345/619 |
| 2013/0222423 A1* | 8/2013 | Fields | G06T 19/20 |
| | | | 345/629 |

FOREIGN PATENT DOCUMENTS

| | | |
|---|---|---|
| JP | 2011014117 A | 1/2011 |
| KR | 10-2010-0054303 | 5/2010 |

OTHER PUBLICATIONS

JP OA received from JPO for Patent Application No. 2016-524181. (with English Translation) dated Jul. 10, 2018.

\* cited by examiner

|   | 1 | 2 | 3 | 4 | 5 | 6 | 7 | 8 |
|---|---|---|---|---|---|---|---|---|
| A | 110A | 115A | 120A | | 125A | 130A | | 135A |
| B | | 145A | 150A | | | 155A | 160A | 165A |
| C | | 140A | | 170A | | 175A | 110B | 115B |
| D | 180A | 185A | 190A | | | | 130B | |
| E | | 120B | 125B | | 195A | | 150B | 155B |
| F | 135B | | 140B | | 145B | 170B | 175B | 160B |
| G | 165B | 180B | 185B | | | 190B | | 110C |
| H | 115C | 120C | | 125C | | 145C | | 135C |
| I | | | | 140C | | | | 150C | 155C |
| J | 130C | | | | | 180C | | |
| K | 170C | | | | | | 190C | |

*FIG. 4B*

|   | 1 | 2 | 3 | 4 | 5 | 6 | 7 | 8 |
|---|---|---|---|---|---|---|---|---|
| A | 110A | 115A | 120A | | 125A | 130A | | 135A |
| B | | 145A | 150A | 155A | | | 160A | 165A |
| C | | 170A | | | 180A | | 175A | |
| D | 185A | | | 190A | | | | 110B | 135B |
| E | | 140A | | | 115B | 125B | | 130B |
| F | 120B | | 145B | 195A | | | 150B | 155B | 165B | 175B |
| G | | | 140B | | 170B | 160B | |
| H | | | 190B | | | 195B | | 110C |
| I | 180B | 185B | 135C | | | | 110C | |
| J | 120C | | 145C | 150C | | 115C | 125C |
| K | 130C | | | | 155C | 160C | 180C |

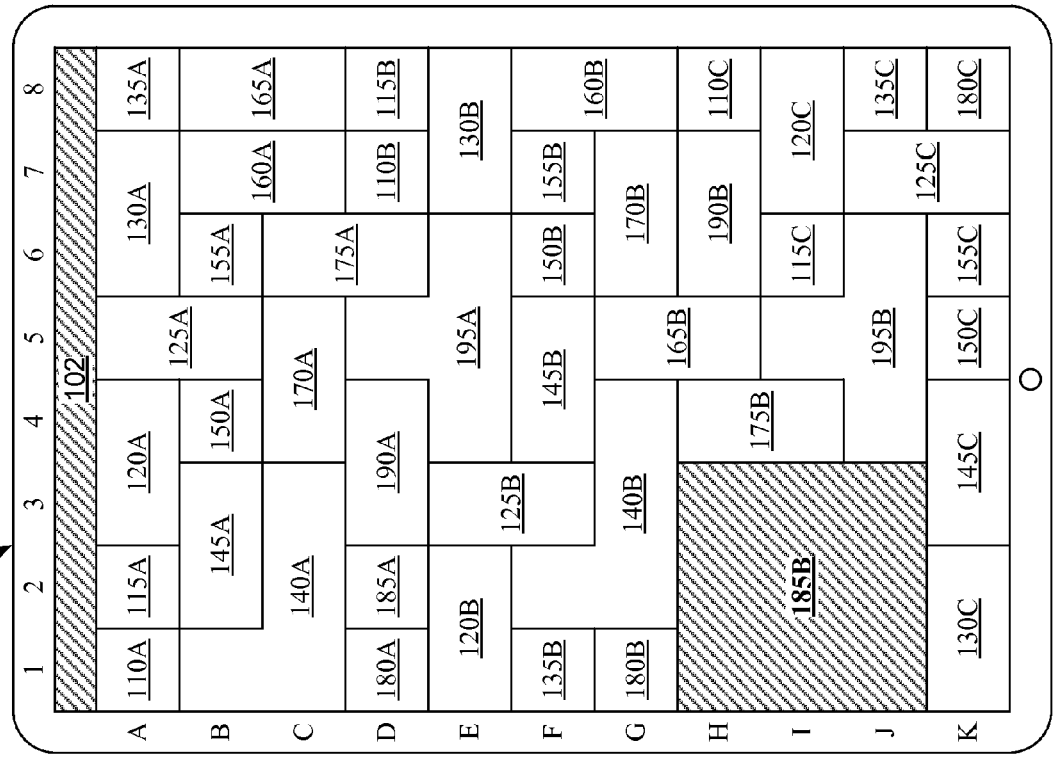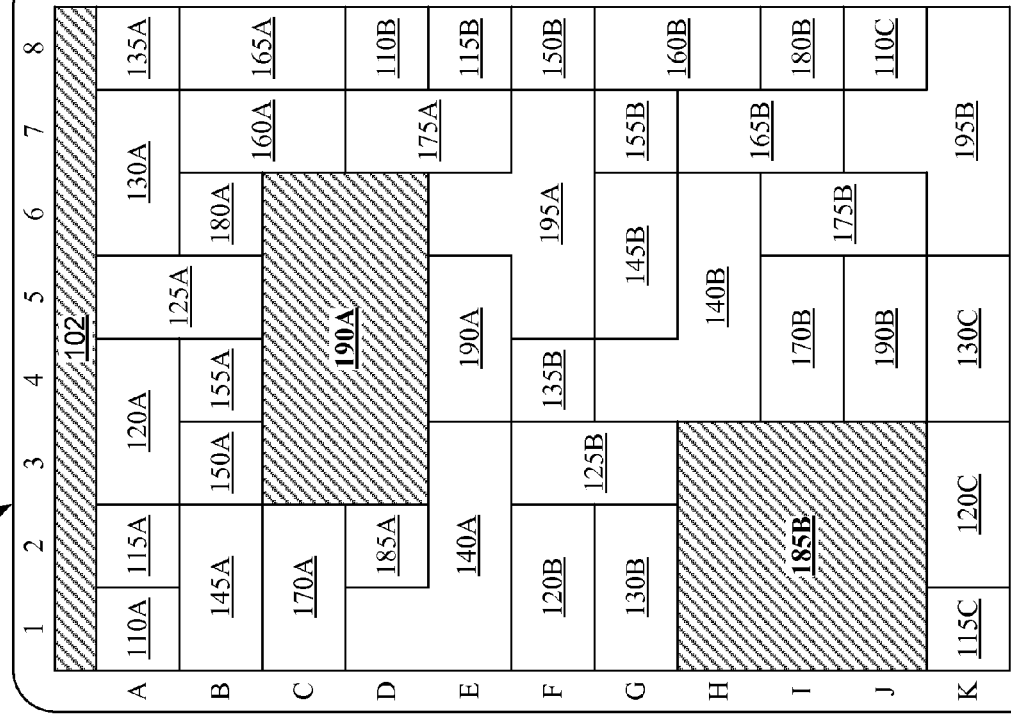

FLEXIBLE IMAGE LAYOUT

TECHNICAL FIELD

This disclosure generally relates to rendering a display of an array of image elements.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments determine a layout of image elements. An image element comprises a picture, a map, a story block of text, a page of a document, an icon, or any thumbnail image, or any combination thereof. Image elements are placed into a display grid that corresponds to specifications for a displayable region of a screen associated with a computing device. Specifications for the displayable region may comprise height, width, a diagonal dimension, orientation, or screen resolution. The displayable region may comprise the entire screen or a portion thereof (e.g., one window on the screen, or the remaining available screen real estate after accounting for space occupied by a horizontal status bar and a vertical menu sidebar). Specifications for the displayable region may include height, width, and/or a diagonal dimension of the displayable region (which may be specified as a number of columns, a number of rows, pixels, inches, feet, metric units, or any other conventional unit of measurement), screen orientation (portrait or landscape mode), or screen resolution. The display grid may be determined according to the specifications for the displayable region.

The matching of a candidate image element to a set of unoccupied positions may be based on attributes of the image element, such as shape, size, placement pattern, placement origin, zoom magnitude, or zoom pattern. The matching process may comprise determining, for the image element, a pattern of positions, based on the size and the shape of the image element and a size of a position in the grid and then determining the set of the unoccupied positions, based upon the pattern of positions.

When there exists more than one candidate image element that matches the set of unoccupied positions, the particular candidate image element matched to the set of the unoccupied positions may be selected according to one or more placement rules. The placement rules may establish an order for placement of the candidate image elements into the grid. The order for placement of the candidate image elements into the grid may be based on a ranking of the candidate image elements, wherein the ranking is based on social-networking information associated with the candidate image elements. The ranking of the candidate image elements may be re-assessed after each time a candidate image element is matched to a set of positions in the grid. If the placement rules prohibit a matched image element from appearing in the grid more than once, each matched image element may be designated as no longer being a candidate for placement within the grid.

When there exists more than one set of unoccupied positions that matches the candidate image element, the particular set of the unoccupied positions matched to the candidate image element may be selected according to one or more placement rules. The placement rules may establish an order for filling positions in the display grid. The order for filling positions in the display grid may be based on a directional path of placement with respect to a starting point in the display grid, a prioritization of placement along a first axis versus placement along a second axis, or an orientation of the displayable region. The order for filling positions in the display grid may be re-assessed after each time a candidate image element is matched to a set of positions in the grid.

In particular embodiments, the steps to determine a layout of image elements may be performed by a computing device associated with a screen. In particular embodiments, a computer server may obtain specifications for a displayable region of a screen associated with a client computing device, perform steps described herein, and then provide the layout information to the client device associated with the screen.

BRIEF DESCRIPTION OF THE DRAWINGS

FIGS. 3A-B illustrate an example use case of alternative placement rules upon a layout of image elements.

FIGS. 4A-D illustrate an example use case of zooming in and out of particular image elements upon a layout of image elements.

FIGS. 5A-B illustrate an example use case of scrolling down upon a layout of image elements.

DESCRIPTION OF EXAMPLE EMBODIMENTS

Particular embodiments determine a layout of image elements. Image elements are placed into a display grid that corresponds to specifications for a displayable region of a screen associated with a computing device. The displayable region may comprise the entire screen or a portion thereof (e.g., one window on the screen, or the remaining available screen real estate after accounting for space occupied by a horizontal status bar and a vertical menu sidebar). Specifications for the displayable region may include height, width, and/or a diagonal dimension of the displayable region (which may be specified as a number of columns, a number of rows, pixels, inches, feet, metric units, or any other conventional unit of measurement), screen orientation (portrait or landscape mode), or screen resolution. The display grid may be determined according to the specifications for the displayable region.

Figure 1:
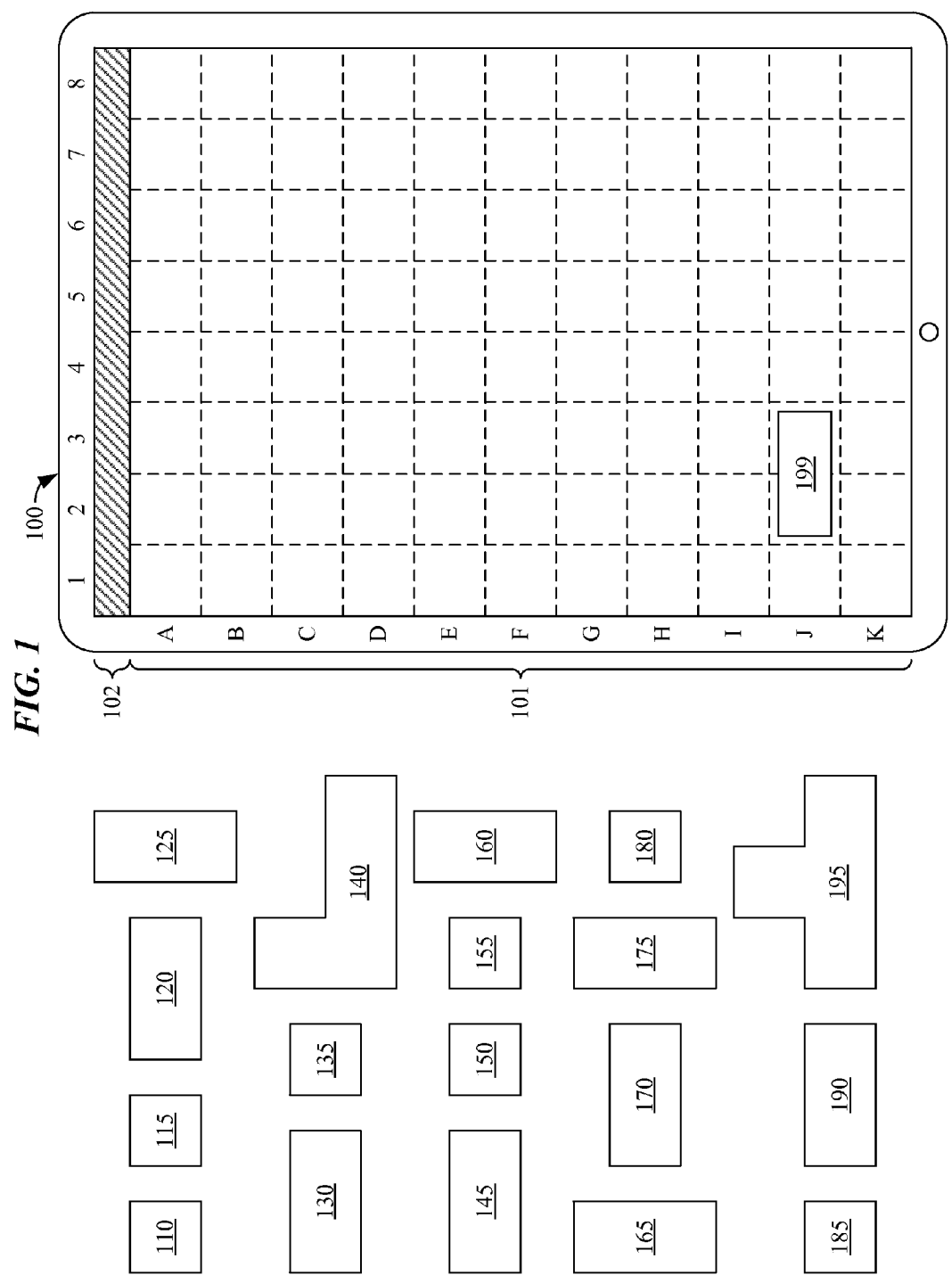
FIG. 1 illustrates an example display grid and a sequence of image elements.

FIG. 1 illustrates an example display grid and a sequence of image elements. Example computing device 100 has a screen wherein a displayable region 101 includes a representation of a display grid and a horizontal region 102 is reserved for display of a status bar. Positions in the representation of a display grid illustrated in FIG. 1 are delineated by dashed grid lines and may be identified by coordinates specifying a location along the vertical axis (locations A-K) and a location along the horizontal axis (locations 1-8).

Image elements may be of any shape or size, and each image element may occupy one or more positions in the display grid. The example sequence of image elements 110-195 illustrated in FIG. 1 include image elements of a variety of shapes, sizes, and placement patterns:
  image elements 110, 115, 135, 150, 155, 180, and 185 each occupy one position in the display grid;
  image elements 120, 130, 145, 170, and 190 each occupy two horizontally-adjacent positions in the display grid;
  image elements 125, 160, 165, and 175 each occupy two vertically-adjacent positions in the display grid;
  image element 140 occupies four positions in the display grid, wherein the four positions are configured in a sideways L-shape; and
  image element 195 occupies four positions in the display grid, wherein the four positions are configured in an upside-down T-shape.

An image element may comprise an image of any type of visual content, such as, by way of example and not limitation, a picture, a video frame, a video, a map, a text block, a page of a document, a screenshot, or any thumbnail image representation. The sequence of image elements may comprise any type or combination of types of image elements. The order of image elements in the sequence may be determined in any manner.

Figure 2:
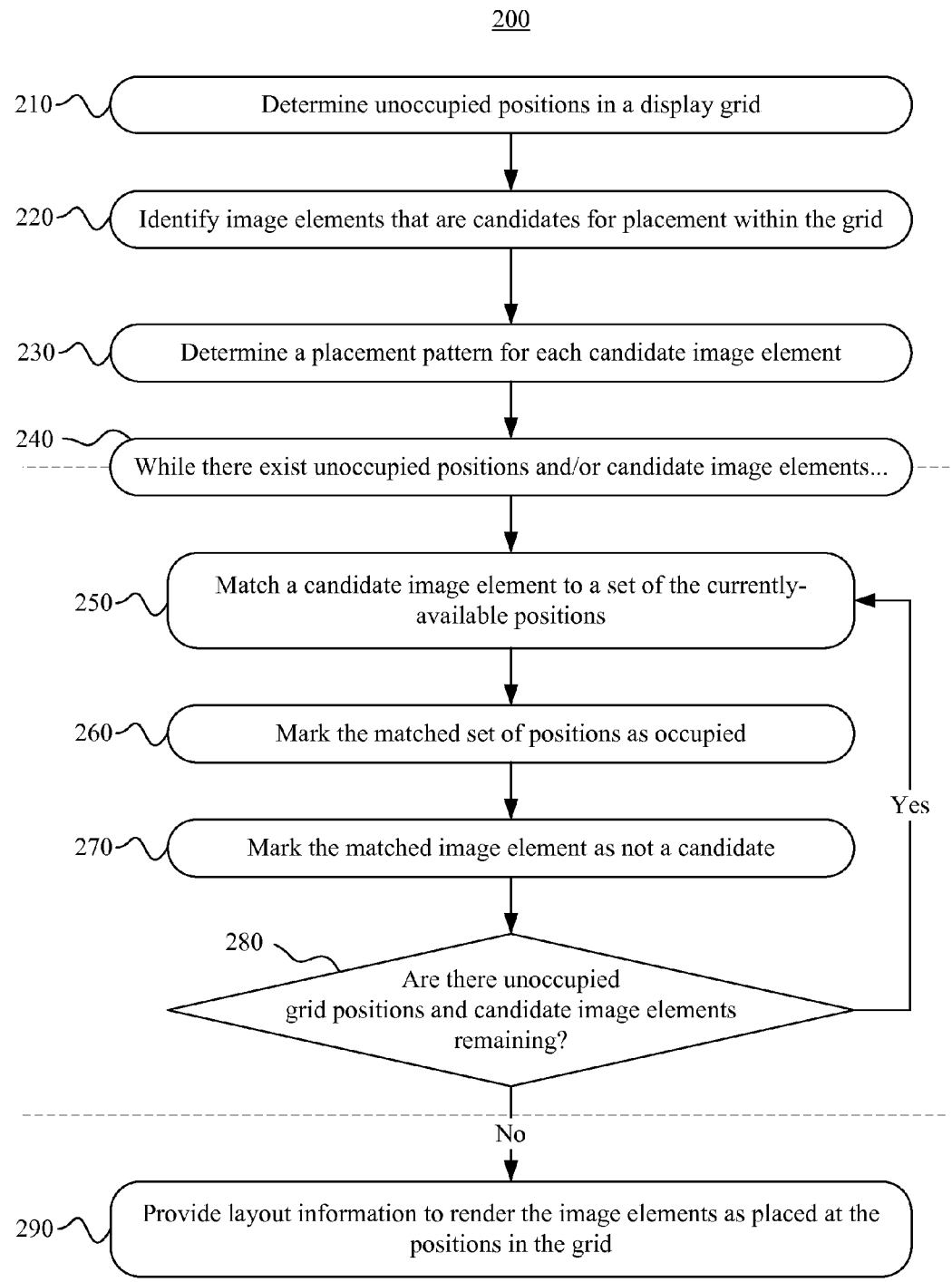
FIG. 2 is a flowchart illustrating an example method for determining a layout of image elements with respect to a display grid.

FIG. 2 is a flowchart illustrating an example method for determining a layout of image elements using a display grid. When placing candidate image elements into unoccupied positions in a display grid, a placement algorithm identifies matches between candidate image elements and corresponding sets of one or more grid positions, based on placement patterns for the candidate image elements and a set of placement rules.

In step 210, the placement algorithm determines unoccupied positions in a display grid. Positions in the display grid may be marked as occupied due to specific regions of the display grid being reserved for a particular purpose. For example, reserved regions are marked as occupied in the display grids illustrated in FIGS. 3A-B (region 103), FIGS. 5A-B (regions 104, 105, and 106). Positions in the display grid may also be marked as occupied by particular image elements that placed into the grid prior to commencing the main loop of the placement algorithm where candidate image elements are matched to unoccupied positions in the grid. For example, FIGS. 4A-D illustrate progressive layouts that change in response to user input selecting (and deselecting) images to zoom in on—when image element 190A is selected in FIG. 4A for zoom-in (at 400%), the zoomed-in version of image element 190A is generated and/or retrieved, and then, prior to commencing layout of the rest of the image elements into the display grid of FIG. 4B, the placement algorithm determines where to place the zoomed-in version of image element 190A, and marks those positions (C3-C6 and D3-D6) as occupied.

In step 220, the placement algorithm identifies a group of image elements that are candidates for placement within the display grid. In particular embodiments, the placement algorithm may retrieve a number of images (e.g., from a local data store and/or from a remote server), and then determine, based on information associated with each of the image elements, whether each image element is a candidate for placement within the display grid. In particular embodiments, determination of images may comprise retrieving or requesting images from one or more local data stores, from one or more remote data stores, from one or more databases, from one or more third-party servers, or by accessing one or more APIs. In particular embodiments, retrieval of images may comprise generating screenshots, generating thumbnails, extracting video frames, cropping images, scaling images, converting images from one format to another (e.g., vector to raster, or Portable Networking Graphics (PNG) to Joint Photographic Experts Group (JPEG)).

The image elements may include images of social-networking content. Such images may include images associated with the viewer, images associated with other users connected to the viewer in a social graph (which may be limited to users connected to the viewer within a particular degree of separation, users within a particular group or organization, users sharing particular interests or affinities with the viewer, or users having a similar profile as the user or a target demographic profile) or images associated with particular users or concepts that the viewer is following. Example embodiments of a social graph are described in further detail with respect to FIG. 7. Example embodiments of a social-networking system are described in further detail with respect to FIG. 6.

The set of images in the sequence may include a set of captured images of online content. In particular embodiments, an image may represent a screenshot of a website, a portion of a website, or a screenshot of some other type of online content. For example, images may include screenshots of current news stories for topics, companies, politicians, or celebrities that the user is following. Upon clicking on the image, the viewer may be taken to the website for the screenshot. Such captured images may be generated by a web crawler or received from third-party servers. For example, the placement algorithm may retrieve a number of images tagged as including a user of a social-networking website, and then designate as candidates those image elements that are associated with location information. As noted with respect to step 210, the set of candidate image elements may not include those image elements that have already been placed into the display grid (e.g., zoomed-in image 190A).

In step 230, the placement algorithm determines a placement pattern for each candidate image element. The placement pattern of an image element comprises the pattern of grid positions occupied by an image element. In particular embodiments, the placement pattern must comprise a set of contiguous grid positions; in other embodiments, the placement pattern of positions occupied by an image element need not comprise a set of contiguous positions. In particular embodiments, if an image element (or a portion thereof) does not fill the entire cell of display space delineated by a set of coordinates (e.g., A1), the process of determining the placement pattern of the image element may comprise designation of the whole cell of display space specified by the coordinates as being occupied by the image element (or portion thereof). For example, as shown in FIG. 1, image element 199 does not fill the entirety of grid positions J2 and J3; however, image element 199 is said to "occupy" grid positions J2 and J3. In particular embodiments, an image element that does not fill the entirety of its occupied grid position(s) may be scaled, cropped, stretched and/or otherwise modified so as to fill more of (if not all of) the cells of display space specified by the grid position(s). For the purposes of the examples shown in FIGS. 1, 3A-D, 4A-B, and 5A-B, each image element 110-195 is illustrated so as to fill the entirety of the grid positions occupied by the image element. In particular embodiments, the placement pattern of an image element may be stored in conjunction with the image element (e.g., as metadata associated with the image element).

In step 240, the placement algorithm initiates the main loop to perform steps 250-280 in order to place candidate image elements into unoccupied positions in the grid (the placement algorithm may continue to execute as long as there are candidate image elements and unoccupied positions remaining).

In step 250, the placement algorithm matches a candidate image element to a set of the unoccupied positions—the placement algorithm identifies matches between candidate image elements and corresponding sets of one or more grid positions, based on attributes of the candidate image elements (e.g., shape, size, placement pattern, placement origin, zoom magnitude, or zoom pattern) and a set of placement rules.

In particular embodiments, the placement algorithm may focus on finding the first set of unoccupied positions that correspond to the placement pattern for a particular candidate image element. If more than one set of unoccupied positions that matches the candidate image element exist, the particular set of the unoccupied positions that is matched to the candidate image element may be selected according to one or more placement rules. Such placement rules may establish an order for filling positions in the display grid. The order may be based one or more factors, such as, by way of example and not limitation, a directional path of placement with respect to a starting point in the display grid (e.g., top-left corner of the display grid or a central point in the middle of the display grid) and/or a grid-filling pattern (e.g., when arriving at the end of a row or column, the pattern may (1) jump to the opposite end of the next row or column in conventional text layout pattern, or (2) make a U-turn onto the next row or column in a zigzag pattern), a prioritization of placement along a first axis versus placement along a second axis, or an orientation of the displayable region. In particular embodiments, the order for filling positions in the display grid may be re-assessed after each time a candidate image element is matched to a set of positions in the grid.

In alternate embodiments, the placement algorithm may focus on finding the first candidate image element whose placement pattern corresponds to the possible sets of unoccupied positions that include a particular unoccupied position. If more than one candidate image element matches a set of unoccupied positions, the particular candidate image element matched to the set of the unoccupied positions may be selected according to one or more placement rules. The placement rules may establish an order for placement of the candidate image elements into the grid, wherein the order for placement of the candidate image elements into the grid is based on a ranking of the candidate image elements. The candidate image elements may be organized into a sequence, based on a ranking, an order (e.g., chronological order), other etc. In particular embodiments, the ranking of the candidate image elements may be re-assessed after each time a candidate image element is matched to a set of positions in the grid.

Images may be selected to be candidates and/or ranked according to relevance to the user, user preferences, or other factors. In particular embodiments, images may be selected and/or ranked in accordance with social-networking information. A social-networking system may determine a relevance score for an image based at least in part on a connection value for the image. As an example and not by way of limitation, a number of people depicted in the image who are associated with user nodes connected to the viewer in the social graph may affect the connection value. As an example and not by way of limitation, a degree of separation between user nodes of the social graph and the viewer may affect the connection value. As another example, the type of connection between the viewer and the user nodes of the social graph user may affect the connection value. As an example and not by way of limitation, "friendship"-type connections may be associated with a higher connection value than a "work colleague"-type connection.

A social-networking system may determine a relevance score for an image based at least in part on an interest value for the image. The interest value may be based at least in part on whether a category or categories assigned to the image coincide with the category or categories associated with the viewer's interests. The interest value may be based at least in part on whether a category or categories assigned to people, locations, objects, or actions depicted in the image coincide with the category or categories associated with the viewer's interests. The interest value may be based at least in part on whether a category or categories assigned to social-networking information, third-party information, or metadata associated with the image coincide with the category or categories associated with the viewer's interests.

As an example and not by way of limitation, an object in the social graph may include a user or concept profile, or information associated with a user node that is connected to the user. As another example, an action may include friending/unfriending a user node, "liking" a content object, becoming a fan of a third party, joining a group or community of users on social-networking system 160, or visiting a website of a third party. As another example, third-party information may include information of activity of the user or purchases by the user on a third-party website.

Determination of relevance scores is discussed in further detail in U.S. patent application Ser. No. 12/976,859, filed 22 Dec. 2010 and titled "Timing for Providing Relevant Notifications for a User Based on User Interaction with Notifications," which is incorporated herein by reference.

The relevance score may be based at least in part to an affinity for the user with respect to the object of the social graph, as described above. As an example and not by way of limitation, affinity for past, present, or future content may be determined by the processing module of the content engine based on user activities, activities of the user nodes of the social graph, or associated connections, or any combination thereof. Affinity may be calculated using a weighted set of predictor functions. Predictor functions predict whether the user will perform a particular action. The predictor functions may predict any number of actions, which may be within or outside of the social networking system. Any type of variable may be considered when determining affinity to weight the aggregated consolidated data. Determination and use of measures of affinity are discussed in further detail in the following U.S. patent applications, all of which are incorporated herein by reference: U.S. patent application Ser. No.

11/502,757, filed on 11 Aug. 2006, titled "Generating a Feed of Stories Personalized for Members of a Social Network," and issued as U.S. Pat. No. 7,827,208; U.S. patent application Ser. No. 12/645,481, filed on 23 Dec. 2009 and titled "Selection and Presentation of Related Social Networking System Content and Advertisements;" U.S. patent application Ser. No. 13/247,825, filed on 28 Sep. 2011 and titled "Instantaneous Recommendation of Social Interactions in a Social Networking System;" U.S. patent application Ser. No. 12/976,755, filed on 22 Dec. 2010 and titled "Pricing Relevant Notifications Provided to a User Based on Location and Social Information;" U.S. patent application Ser. No. 12/978,265, filed on 23 Dec. 2010 and titled "Contextually Relevant Affinity Prediction in a Social Networking System;" and U.S. patent application Ser. No. 13/632,869, filed on 1 Oct. 2012 and titled "Mobile Device-Related Measures of Affinity."

Figure 3A:
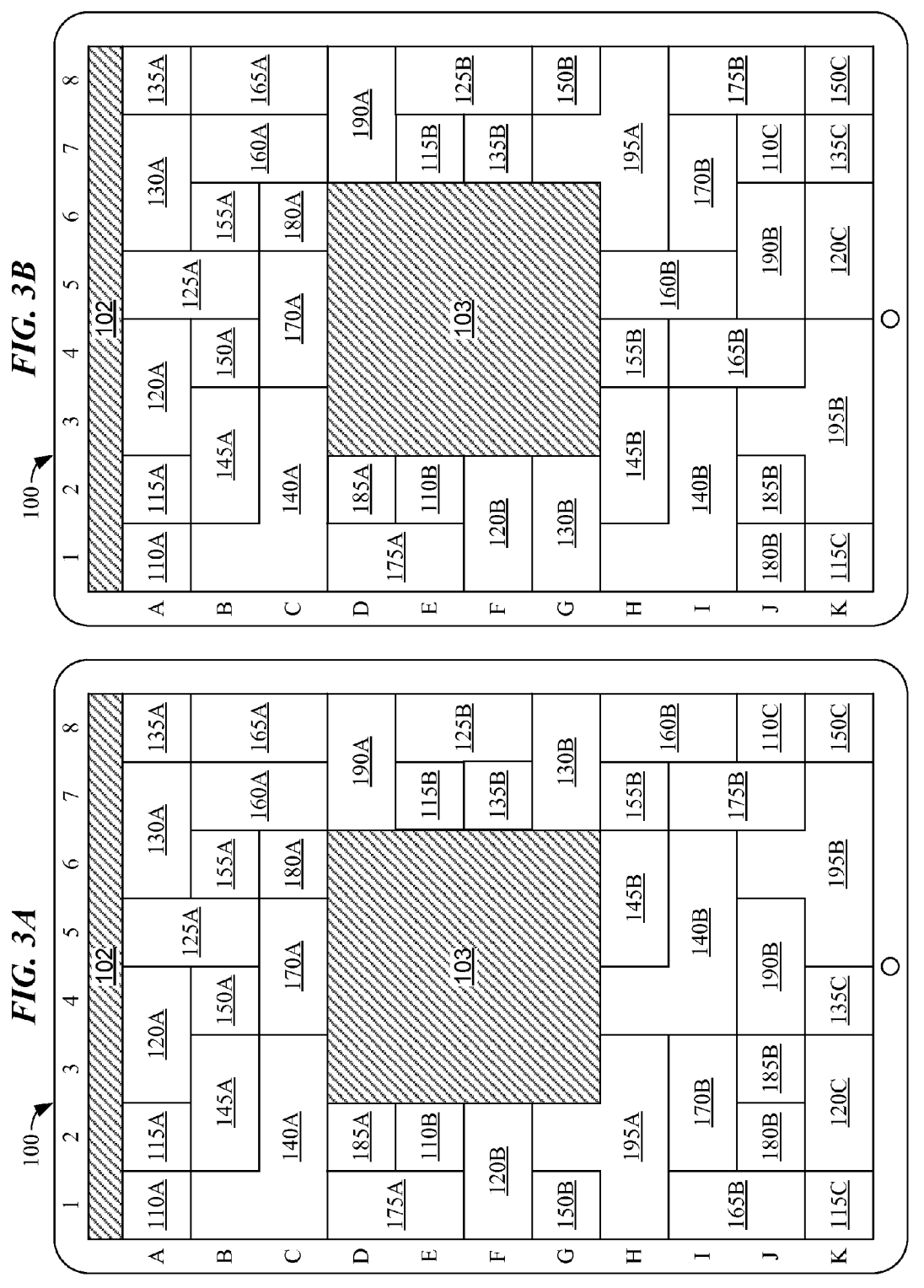

FIGS. 3A-B provides an example illustrating the difference between these two placement strategies. In particular embodiments, as a part of this step, if the placement algorithm has determined that a particular candidate image element cannot be matched to any remaining sets of unoccupied positions, the placement algorithm may remove the image element from the group of candidate image elements.

In step 260, the placement algorithm marks the matched set of positions as occupied—in particular embodiments, the placement algorithm may mark the matched set of positions as occupied by the matched image element.

In step 270, the placement algorithm may remove the matched image element from the group of candidate image elements (in cases where the placement algorithm only allows the image element to appear in the display grid once).

In step 280, the placement algorithm determines whether to continue the main loop, based on whether there are candidate image elements and unoccupied positions remaining. If there are any unoccupied positions remaining, but no candidate image elements remaining, particular embodiments may repeat the set of candidate image elements, so as to be able to present a fully-filled layout of image elements.

In step 290, once the loop has completed and the placement algorithm has matched the greatest-possible number of candidate image elements to unoccupied sets of grid positions, layout information is provided to render the image elements as placed at the positions in the grid.

In particular embodiments, the steps of method 200 may be performed on a computer server, which sends either just the information to create the array of contiguous image elements, or sends the actual array of contiguous image elements (including the image elements themselves. In particular embodiments, the steps of method 200 may be performed on a user's computing device. In such embodiments, when the user wants to insert or update images in the sequence, the user may send a request to one or more computer servers for one or more image elements, insert the one or more image elements into the sequence, and re-determine the array of contiguous image elements.

FIGS. 3A-B illustrate an example use case of alternative placement rules upon a layout of image elements. In both FIG. 3A and FIG. 3B, identical display grids including reserved region 103 were marked as occupying positions D3-G6, the same sequence of candidate image elements was available to be placed at positions in the display grids. However, the placement rules for FIG. 3A specify that the placement algorithm must find the first uppermost-leftmost set of unoccupied positions that can fit the next image in the sequence, whereas the placement rules for FIG. 3B specify that the placement algorithm must find the first candidate image element whose placement pattern corresponds to the possible sets of unoccupied positions that include the uppermost-leftmost unoccupied position. At the beginning stages, there appears to be no difference in the image layout as between the two different placement rules, however, differences begin to appear with the placement of image element 195A.

Since the placement rules applied with respect to the layout in FIG. 3A focus on finding a set of unoccupied positions that fit the next image element in the sequence, image element 195A was placed at the first set of unoccupied positions in the grid (G2 and H1-3) that corresponded to the placement pattern for image element 195A. On the other hand, the placement rules applied with respect to the layout in FIG. 3B focus on finding the first image element in the sequence whose placement pattern corresponds to a set of unoccupied positions that include a particular unoccupied position (G1)—the placement pattern of image element 195A did not allow for the possibility of occupying position G1, so image element 130B was matched to the set of unoccupied positions including G1 and G2, and image element 195A was later matched to the set of unoccupied positions including positions G7 and H6-8.

The placement origin of an image element is a designation of a particular position in the placement pattern for the image element—this position is the "leading edge" when identifying a particular set of grid positions in the display grid at which the image element is to be placed. Placement origin applies only to image elements whose placement pattern comprises two or more grid positions.

The placement origin for an image element may change based on the particular placement rules applied when placing image elements into the grid. For example, placement rules may specify placement in accordance with the typical left-to-right, top-to-bottom English layout. In this example, the placement origin of image element 120 from FIG. 1 (whose placement pattern occupies two horizontally-adjacent grid positions) would be the left one of the two grid positions, whereas the placement origin of image element 125 from FIG. 1 (whose placement pattern occupies two vertically-adjacent grid positions) would be the upper one of the two grid positions. However, if a different placement rule were applied to specify placement in accordance with typical top-to-bottom, right-to-left Chinese text layout, the placement origin of image element 120 (whose placement pattern occupies two horizontally-adjacent grid positions) would be the left one of the two grid positions, whereas the placement origin of image element 125 (whose placement pattern occupies two vertically-adjacent grid positions) would be the upper one of the two grid positions.

In particular embodiments, the placement origin for certain types of (or all) image elements may be specified (e.g., in configuration settings). In one example use case, an image element with a simple placement pattern, such as image element 120 (2×1), or image element 125 (1×2), may have a placement origin that is automatically determined based on the directional path of placement, whereas the determination of placement origin for an image element with a complex placement pattern, such as image element 140 or 195, may be based on configuration settings or on more complex sets of rules.

FIGS. 4A-D illustrate an example use case of zooming in and out of particular image elements upon a layout of image elements. In FIG. 4A, after the image elements have been placed into the display grid and the layout has been rendered for display, user input is received that selects image element 190A (shown in bold) for zooming in. A zoom magnitude of the image element establishes the factor by which the size of the image element is increased when the user selects the image element to zoom in. For simple elements like image element 190A, the zoom magnitude may be pre-determined based on the resolution of the display grid. For example, whereas image element 190A originally occupied two horizontally-adjacent positions in the grid in a 2×1 configuration (D3-D4), zoomed-in image element 190A, as shown in FIG. 4B, occupies a region four times greater than before, having been zoomed in by doubling the number of positions occupied by image element 190A along each axis. A zoom pattern of an image element is the placement pattern for the image element when zoomed in. In the example illustrated in FIG. 4B, the zoom pattern of image element 190A includes eight adjacent grid positions, in a 4×2 configuration.

After the user selects image element 190A for zooming in, the layout of image elements must be refreshed, in order to account for the fact that particular image elements will need to be shuffled around to accommodate zoomed-in image element 190A. Prior to performing the general layout of the image elements, the grid positions to be occupied by zoomed-in image element 190A are marked as occupied. However, since the zoomed-in version of image element 190A occupies more grid positions than original image element 190A, the particular grid positions to be occupied may be selected based on the image element's placement origin. For example, if the placement origin for image element 190A comprises the grid position covering the bottom-most, left-most corner of image element 190A, the placement algorithm may layout image element 190A so that the bottom-most, left-most corner of image element 190A remains at grid position D3.

After rendering the example layout shown in FIG. 4B, additional user input is received zooming in on image element 185B. As shown in FIG. 4C, image element 185B was zoomed in by a zoom magnitude of nine (3×3 from a 1×1), having been zoomed in by tripling the number of positions occupied by image element 185B along each axis. Since image element 185B did not include any placement origin information (since image element 185B originally occupied only one cell of the display grid), the zoomed-in version of image element 185B is centered on the grid position (I2) occupied by the original version of image element 185B. As with image element 190A, prior to performing the general layout of image elements into the display grid as shown in FIG. 4C, the grid positions to be occupied by zoomed-in image element 185B are marked as occupied. FIG. 4D illustrates an updated layout after receiving a user selection to zoom out of image element 190A. As can be seen throughout FIGS. 4A-D, the location of a zoomed-in image may be determined based on the location of the original image element, the image's zoom magnitude, zoom pattern, and any placement origin information.

Figures 5A, 5B:
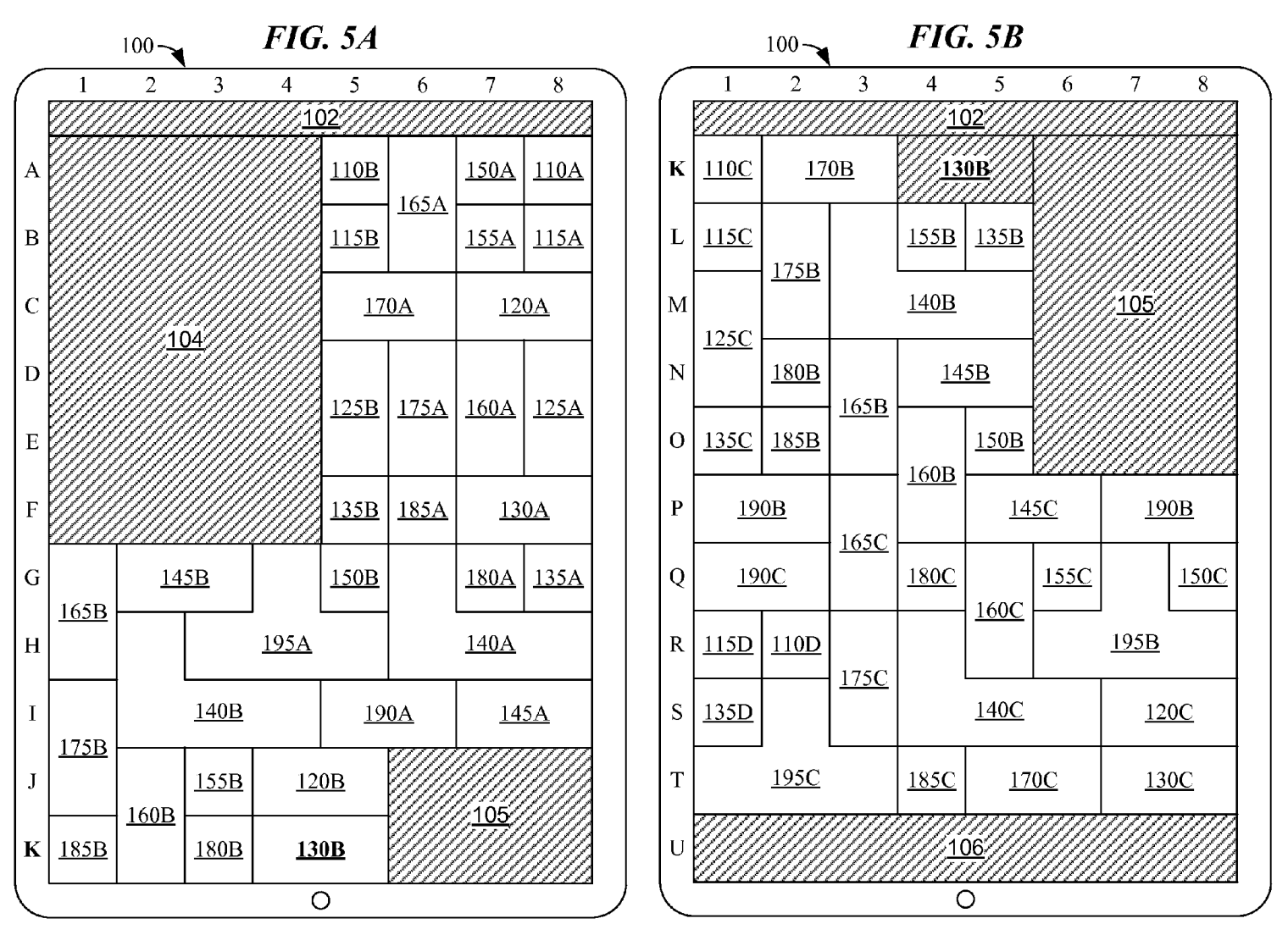

FIGS. 5A-B illustrate an example use case of scrolling down a layout of image elements. The layout of image elements in FIGS. 5A-B specify placement of image elements in accordance with typical top-to-bottom, right-to-left Chinese text layout. In the example illustrated in FIGS. 5A-B, the grid is filled with image elements along a directional path of placement corresponding to a top-to-bottom, right-to-left path of placement, starting from a point at the upper-most, right-most unoccupied position in the display grid. The placement algorithm may prioritize top-to-bottom placement along a vertical axis over right-to-left placement along a horizontal axis. FIGS. 5A-B illustrate several reserved regions 104, 105, and 106.

When a user selection to scroll down the display shown in FIG. 5A is received, the image element placed at the right-most, bottom-most position may be treated as the layout starting point when laying out the updated grid showing image elements after scrolling down. Prior to performing the layout, starting from the new layout starting point for the display shown in FIG. 5B, grid positions for image element 130B are selected (at the best starting point for the updated layout) and marked as occupied. After that, layout of the image elements proceeds as usual, and in accordance with the placement rules.

Figure 6:
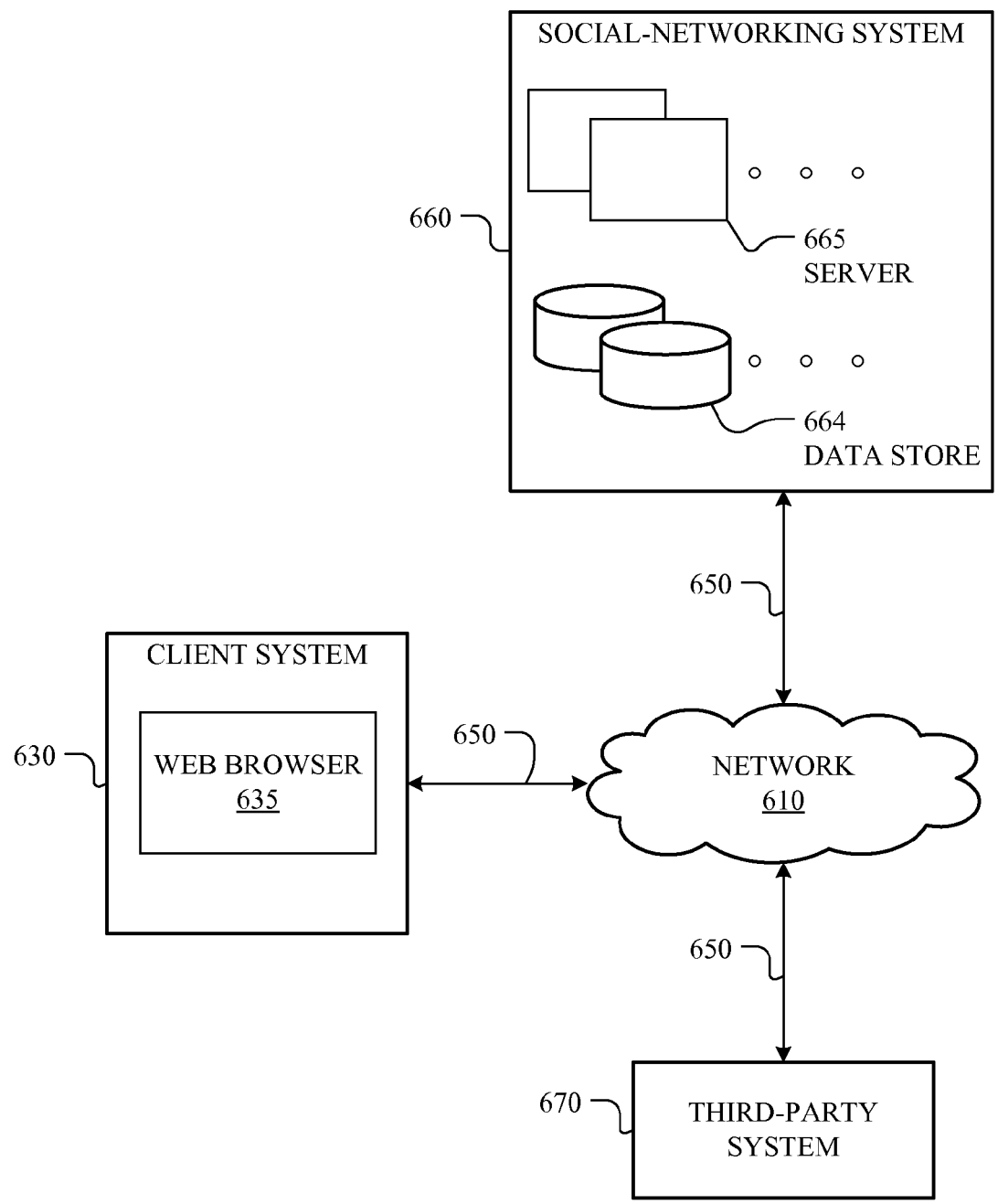
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 664 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 whom they want to be connected to. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
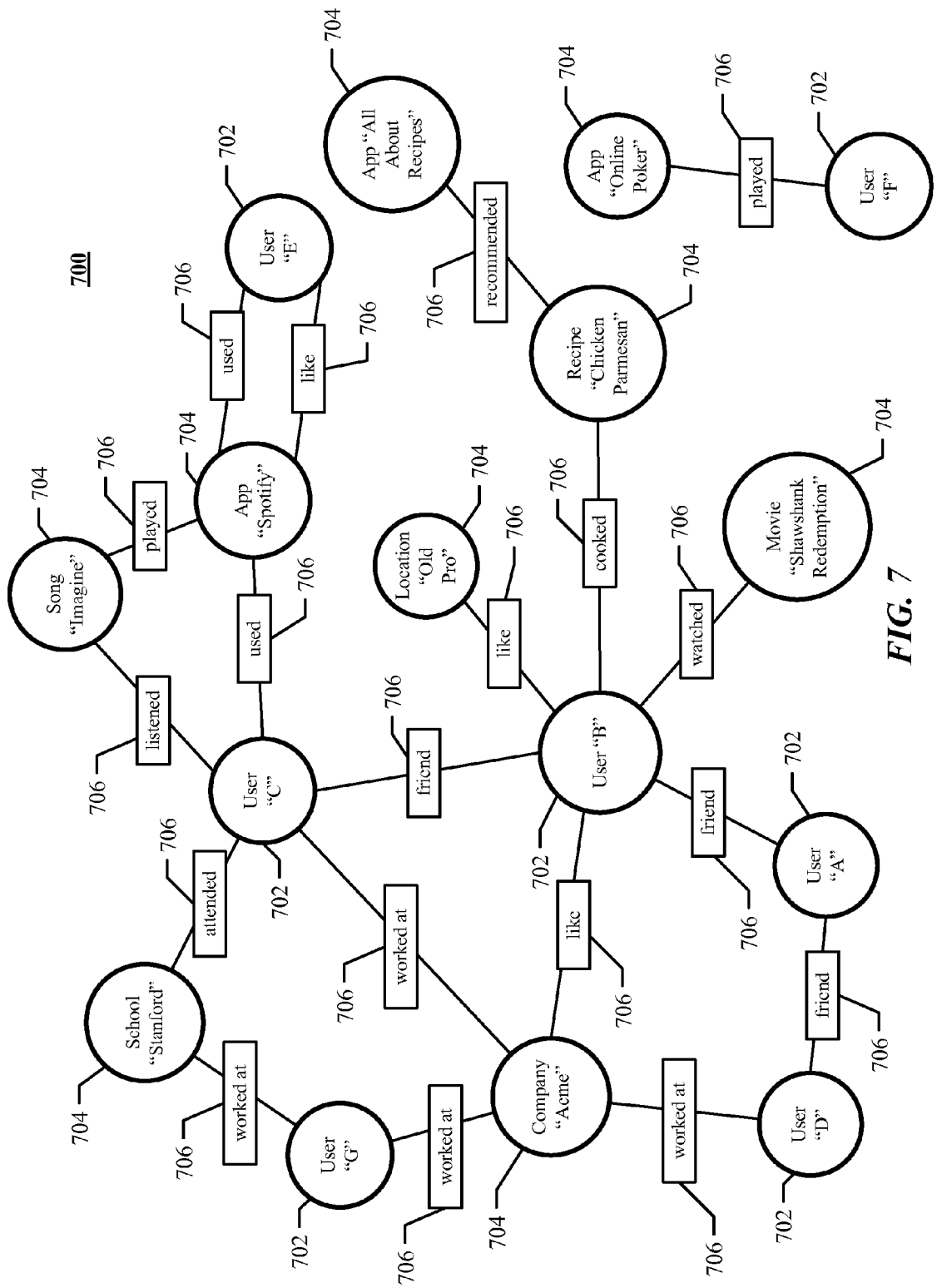
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party server 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 630 to send to social-networking system 660 a message indicating the user's action. In response to the message, social-networking system 660 may create an edge (e.g., an "eat" edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user may make frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular embodiments, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, social-networking system 660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular embodiments, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular embodiments, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular embodiments, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Figure 8:
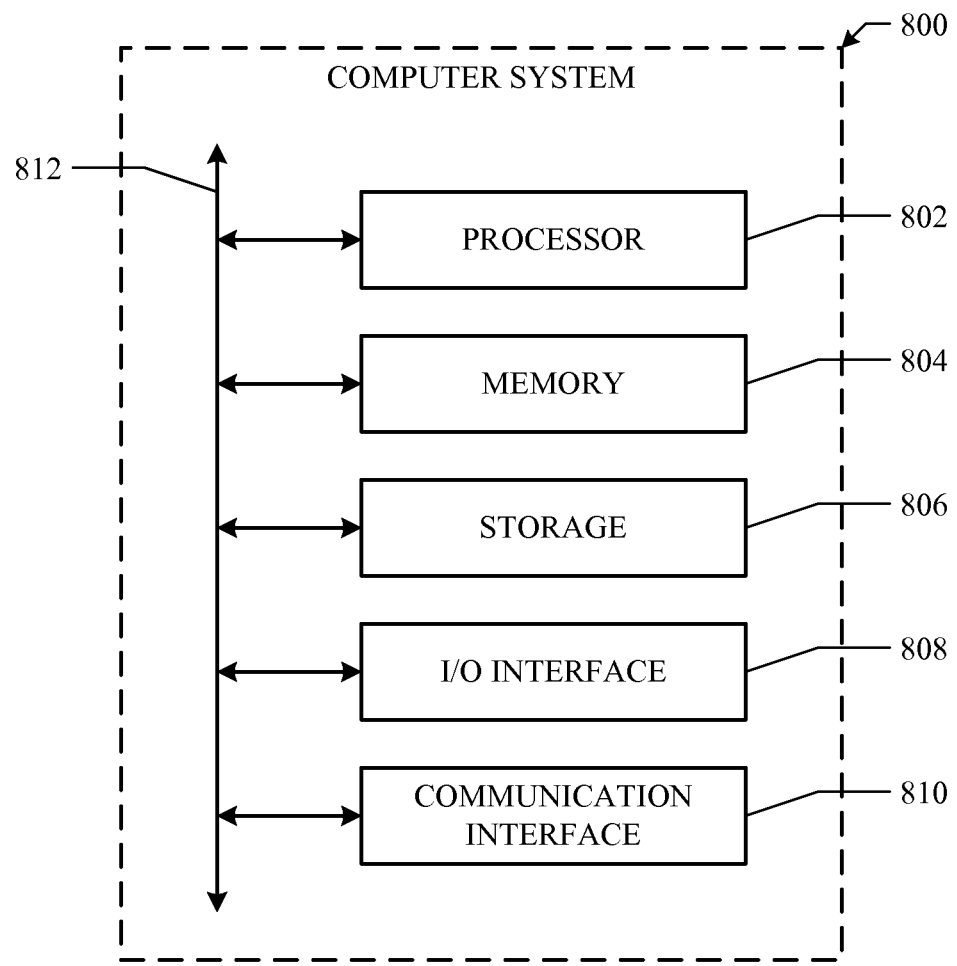
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, determining, for each of a plurality of image elements, a pattern of positions based on a size and shape of the image element and a size of a position in a display grid, wherein the grid corresponds to specifications for a displayable region of a screen associated with the computing device, and wherein positions in the grid are identified by coordinates specifying a location along a vertical axis and a location along the horizontal axis, wherein the pattern of positions for each image element is a set of contiguous grid positions;
by the computing device, determining unoccupied positions in the display grid;
by the computing device, identifying a plurality of image elements that are candidates for placement within the grid;
while at least one of the unoccupied positions and at least one of the candidate image elements exist:
by the computing device, matching one of the candidate image elements to a set of the unoccupied positions based on the pattern of positions for the candidate image element, wherein the matched candidate image element is selected for matching based on a ranking of the candidate image element and based on one or more placement rules that establish an order for filling positions in the display grid using the ranked candidate images based on a directional path of placement with respect to a starting point in the display grid; and
by the computing device, designating the positions in the set as occupied by the matched image element; and
by the computing device, providing layout information to render the image elements in accordance with placement of each matched image element at the designated positions in the grid.

2. The method of claim 1, wherein an image element comprises a picture, a map, a story block of text, a page of a document, an icon, or any thumbnail image, or any combination thereof.

3. The method of claim 1, wherein the specifications for the displayable region comprise height, width, a diagonal dimension, orientation, or screen resolution.

4. The method of claim 1, wherein one or more attributes of an image element comprise shape, size, placement pattern, placement origin, zoom magnitude, or zoom pattern.

5. The method of claim 1, wherein there exists more than one candidate image element that matches the set of unoccupied positions, and wherein the particular candidate image element matched to the set of the unoccupied positions is selected according to one or more placement rules.

6. The method of claim 5, wherein the placement rules prohibit a matched image element from appearing in the grid more than once, further comprising:
designating each matched image element as no longer being a candidate for placement within the grid.

7. The method of claim 1, wherein the order for placement of the candidate image elements into the grid is based on a ranking of the candidate image elements, and wherein the ranking is based on social-networking information associated with the candidate image elements.

8. The method of claim 1, wherein the ranking of the candidate image elements is re-assessed after each time a candidate image element is matched to a set of positions in the grid.

9. The method of claim 1, wherein there exists more than one set of unoccupied positions that matches the candidate image element, and wherein the particular set of the unoccupied positions matched to the candidate image element is selected according to one or more placement rules.

10. The method of claim 9, wherein the placement rules establish an order for filling positions in the display grid.

11. The method of claim 10, wherein the order for filling positions in the display grid is based on a directional path of placement with respect to a starting point in the display grid, a prioritization of placement along a first axis versus placement along a second axis, or an orientation of the displayable region.

12. The method of claim 10, wherein the order for filling positions in the display grid is re-assessed after each time a candidate image element is matched to a set of positions in the grid.

13. The method of claim 1, wherein the pattern of positions based on a size and shape of the image element and a size of a position in a display grid comprises a set of contiguous image elements.

14. The method of claim 1, wherein the one or more placement rules establish a chronological order for filling positions in the display grid.

15. One or more computer-readable non-transitory storage media embodying software that is operable when executed to:
determine, for each of a plurality of image elements, a pattern of positions based on a size and shape of the image element and a size of a position in a display grid, wherein the grid corresponds to specifications for a displayable region of a screen associated with the computing device, and wherein positions in the grid are identified by coordinates specifying a location along a vertical axis and a location along the horizontal axis, wherein the pattern of positions for each image element is a set of contiguous grid positions;

determine unoccupied positions in the display grid;

identify a plurality of image elements that are candidates for placement within the grid;

while at least one of the unoccupied positions and at least one of the candidate image elements exist:

match one of the candidate image elements to a set of the unoccupied positions based on the pattern of positions for the candidate image element, wherein the matched candidate image element is selected for matching based on a ranking of the candidate image element and based on one or more placement rules that establish an order for filling positions in the display grid using the ranked candidate images based on a directional path of placement with respect to a starting point in the display grid; and designate the positions in the set as occupied by the matched image element; and provide layout information to render the image elements in accordance with placement of each matched image element at the designated positions in the grid.

16. The media of claim 15, wherein the order for placement of the candidate image elements into the grid is based on a ranking of the candidate image elements, and wherein the rankings is based on social-networking information associated with the candidate image elements.

17. A computing device comprising:

one or more processors; and a memory coupled to the processors comprising instructions executable by the processors, the processors being operable when executing the instructions to:

determine, for each of a plurality of image elements, a pattern of positions based on a size and shape of the image element and a size of a position in a display grid, wherein the grid corresponds to specifications for a displayable region of a screen associated with the computing device, and wherein positions in the grid are identified by coordinates specifying a location along a vertical axis and a location along the horizontal axis, wherein the pattern of positions for each image element is a set of contiguous grid positions;

determine unoccupied positions in the display grid;

identify a plurality of image elements that are candidates for placement within the grid;

while at least one of the unoccupied positions and at least one of the candidate image elements exist:

match one of the candidate image elements to a set of the unoccupied positions based on the pattern of positions for the candidate image element, wherein the matched candidate image element is selected for matching based on a ranking of the candidate image element and based on one or more placement rules that establish an order for filling positions in the display grid using the ranked candidate images based on a directional path of placement with respect to a starting point in the display grid; and designate the positions in the set as occupied by the matched image element; and provide layout information to render the image elements in accordance with placement of each matched image element at the designated positions in the grid.

18. The system of claim 17, wherein the order for placement of the candidate image elements into the grid is based on a ranking of the candidate image elements, and wherein the ranking is based on social-networking information associated with the candidate image elements.

\* \* \* \* \*